US012522973B2

United States Patent
Leibman et al.

(10) Patent No.: US 12,522,973 B2
(45) Date of Patent: Jan. 13, 2026

(54) AIR HEATER FOR FRONT LOAD WASHING MACHINE (71) Applicant: Haier US Appliance Solutions, Inc., Wilmington, DE (US)

(72) Inventors: Alexander B. Leibman, Prospect, KY (US); Venkata Chakradhar Rangu, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 300 days.

(21) Appl. No.: 18/354,271

(22) Filed: Jul. 18, 2023

(65) Prior Publication Data

US 2025/0027264 A1    Jan. 23, 2025

(51) Int. Cl.
*D06F 58/26* (2006.01)
*D06F 25/00* (2006.01)
*D06F 37/06* (2006.01)
*D06F 39/14* (2006.01)
*D06F 58/04* (2006.01)
*H05B 6/10* (2006.01)
*H05B 6/38* (2006.01)

(52) U.S. Cl.
CPC .............. *D06F 58/26* (2013.01); *D06F 25/00* (2013.01); *D06F 37/06* (2013.01); *D06F 39/14* (2013.01); *D06F 58/04* (2013.01); *H05B 6/105* (2013.01); *H05B 6/38* (2013.01)

(58) Field of Classification Search
CPC .......... D06F 58/26; D06F 25/00; D06F 37/06; D06F 39/14; D06F 58/04; H05B 6/105; H05B 6/38

USPC ........................................................ 68/12.15
See application file for complete search history.

(56) References Cited

U.S. PATENT DOCUMENTS

| | | |
|---|---|---|
| 10,494,754 B2 | 12/2019 | Cho et al. |
| 10,590,595 B2 | 3/2020 | Kalze et al. |
| 10,594,413 B2 | 3/2020 | Reul |
| 10,626,543 B2 | 4/2020 | Lim |
| 10,648,733 B2 | 5/2020 | Kim et al. |
| 10,662,573 B2 | 5/2020 | Xu et al. |
| 10,689,791 B2 | 6/2020 | Bing et al. |
| 10,808,351 B1 | 10/2020 | Flachsbart et al. |
| 10,822,739 B2 | 11/2020 | Lim et al. |

(Continued)

FOREIGN PATENT DOCUMENTS

| | | |
|---|---|---|
| CN | 100432320 C | 11/2008 |
| CN | 207376316 U | 5/2018 |

(Continued)

OTHER PUBLICATIONS

CN207376316U—machine translation (Year: 2018).*
CN100432320C—machine translation (Year: 2008).*

*Primary Examiner* — Tinsae B Ayalew
(74) *Attorney, Agent, or Firm* — Dority & Manning, P.A.

(57) ABSTRACT

Disclosed is a front load laundry appliance comprises a cabinet having a cabinet inlet vent, a drum positioned within the cabinet and accessible through the opening, and a cabinet duct fluidly coupling the cabinet inlet vent to the drum. The appliance defines an inlet flow path through a door duct, the cabinet inlet vent, and the drum. An induction heater comprising an induction coil and a heat transfer element is located within the inlet flow path such that a flow of inlet air in the inlet flow path passes over the heat transfer element.

20 Claims, 8 Drawing Sheets

(56) References Cited

U.S. PATENT DOCUMENTS

| | | | |
|---|---|---|---|
| 11,028,524 B2 | 6/2021 | Bing et al. | |
| 11,479,895 B2 | 10/2022 | Hong et al. | |
| 2008/0216341 A1* | 9/2008 | Mukaiyama | D06F 58/206 34/124 |
| 2019/0352838 A1* | 11/2019 | Lim | D06F 58/26 |

FOREIGN PATENT DOCUMENTS

| | | |
|---|---|---|
| CN | 114687105 A | 7/2022 |
| CN | 217378331 U | 9/2022 |
| WO | WO2020164428 A1 | 8/2020 |

* cited by examiner

AIR HEATER FOR FRONT LOAD WASHING MACHINE

FIELD OF THE INVENTION

The present disclosure relates generally to front load laundry appliances, more particularly to front load washing machines.

BACKGROUND OF THE INVENTION

Laundry appliances such as clothes washers, dryers, or combination washer/dryers perform cleaning processes for a load of laundry items. The processes may include washing and drying of the load. Known laundry appliances use a flow of air to dry a load of laundry following washing. For example, dryers or combination washer/dryers typically use a flow of heated air to dry a load of wet laundry. Some horizontal axis or front load washing machines use a flow of ambient air to dry a load of laundry following washing. Suitable loads for drying in a washer may be limited, for example in size or material type. The drying process in known washing machines may be inefficient in time required and energy used.

Accordingly, improvements to front load washing machines for improved drying processes may be desirable.

BRIEF DESCRIPTION OF THE INVENTION

Aspects and advantages of the invention will be set forth in part in the following description, may be apparent from the description, or may be learned through practice of the invention.

In one exemplary aspect a front load laundry appliance defining a vertical, a lateral, and a transverse direction is provided. The laundry appliance comprises a cabinet having a front panel, the front panel defining an opening and a cabinet inlet vent. The laundry appliance further comprises a drum positioned within the cabinet and accessible through the opening, and a cabinet duct fluidly coupling the cabinet inlet vent to the drum. A door assembly is mounted to the cabinet and rotatable between an open position allowing access to the opening and a closed position blocking access to the opening. The door assembly comprises a door duct, wherein an inlet flow path is defined through the door duct, the cabinet inlet vent, and the drum. The laundry appliance further comprises an induction heater comprising an induction coil and a heat transfer element, the induction heater located within the inlet flow path such that a flow of inlet air in the inlet flow path passes over the heat transfer element.

In another exemplary aspect, a front load clothes washer laundry appliance defining a vertical, a lateral, and a transverse direction is provided. The laundry appliance comprises a cabinet comprising a front panel, the front panel defining an opening and a cabinet inlet vent, a drum positioned within the cabinet and accessible through the opening, and a cabinet duct fluidly coupling the cabinet inlet vent to the drum. A door assembly is rotatably mounted to the cabinet and rotatable between an open position allowing access to the opening and a closed position blocking access to the opening. The door assembly comprises an outer shell defining a door inlet, an inner shell defining a door exhaust, and a door duct fluidly coupling the door inlet and the door exhaust. An inlet flow path is defined through the door inlet, the door duct, the door exhaust, the cabinet inlet vent, the cabinet duct, and the drum. The front load clothes washer laundry appliance further comprises an induction heater comprising an induction coil and a heat transfer element, the induction heater located within the inlet flow path, wherein a flow of inlet air in the inlet flow path passes over the induction heater.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

While described and illustrated in the context of a specific embodiment of horizontal axis (i.e., front-loading) washing machine appliance, using the teachings disclosed herein it will be understood that a horizontal axis washing machine appliance is provided by way of example only. Other laundry appliances having different configurations, different appearances, and/or different features may also be utilized with the present subject matter as well, e.g., front-loading dryer appliances or front-loading combination washer/dryer appliances. Moreover, aspects of the present subject matter may be used in any other consumer or commercial appliance where it is desirable to provide a heated air flow.

Figure 1:
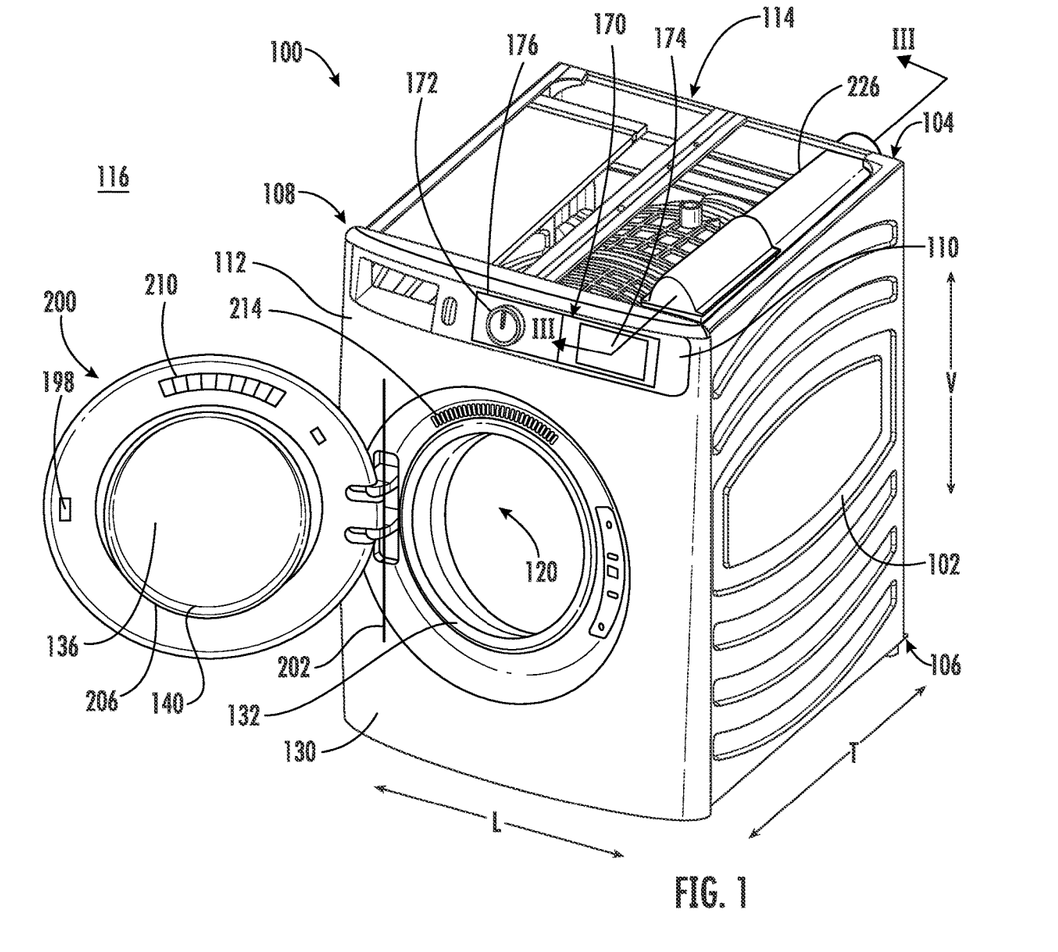
FIG. 1 provides a front perspective view of a laundry appliance with the door open in accordance with an embodiment of the present disclosure.

Turning to the figures, FIG. 1 provides a front view perspective view of an exemplary laundry appliance 100, for example a horizontal axis, or front-loading, laundry appliance. For clarity, the top panel of the cabinet 102 for laundry appliance 100 in FIG. 1 is not shown. As illustrated in the figure, the laundry appliance 100 generally defines a vertical direction V, a lateral direction L, and a transverse direction T, each of which is mutually perpendicular, such that an orthogonal coordinate system is generally defined. Laundry appliance 100 includes a cabinet 102 that extends between a top 104 and a bottom 106 along vertical direction V, between a left side 108 and a right side 110 along the lateral direction L, and between a front 112 and a rear 114 along the transverse direction T. The cabinet 102 includes a front panel 130 defining an opening 132 providing access to the interior of the cabinet 102.

A control panel 170 including a plurality of input selectors 172 is coupled to front panel 130. Input selector 172 may be a selector knob as illustrated in FIG. 1 or any combination of buttons and selector knobs appropriate for user manipulation to control the operation of the laundry appliance 100. For example, a user may manipulate input selectors 172 to select various laundry appliance cycles such as washing, drying, or washing followed by drying in a combination machine. Treatment cycles for treating articles in basket 120 may also be selected or programmed. Control panel 170 and input selectors 172 collectively form a user interface input for user selection of machine cycles and features. For example, in one embodiment, a display 174 indicates selected features, a countdown timer, and/or other data items of interest to machine users.

Operation of laundry appliance 100 is controlled by a controller or processing device 176 (FIG. 1) that is operatively coupled to control panel 170 and input selector(s) 172 for user manipulation to select laundry appliance cycles and features. In response to user manipulation of control panel 170, controller 176 operates the various components of laundry appliance 100 to execute selected machine cycles and features.

Controller 176 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 176 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 170 and other components of laundry appliance 100 may be in communication with controller 176 via one or more signal lines or shared communication busses.

Input selector(s) 172 may be manipulated by a user to instruct the laundry appliance 100 to perform a particular laundry cycle or a series of cycles from a plurality of cycle options. For example, a wash cycle may be selected to be automatically (i.e., without any further user intervention) followed by an overnight dry cycle.

Characteristics of the wash and dry cycles may be selected according to the construction or composition of the articles to be laundered, the intensity of the laundry process sought, or the number of articles present to be treated. Feedback may be provided in response to the user's input on the display 164 and may include indication of the cycle selected, a cycle time display, or messages concerning the operation of the laundry appliance 100.

Figure 3:
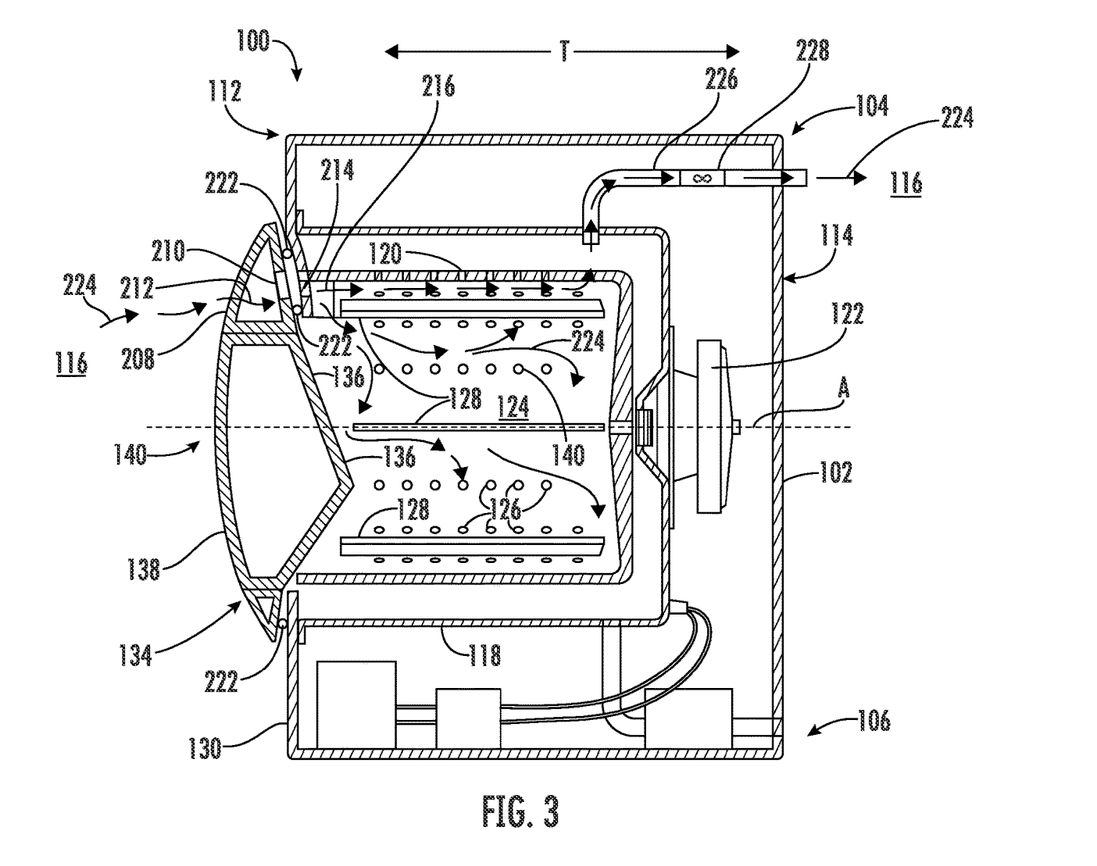
FIG. 3 provides a side sectional view taken along III-III of the laundry appliance of FIG. 1.

As may be best seen in FIG. 3, drum 118 is positioned in the cabinet 102 and is accessible through the opening 132. Drum 118 may generally be a watertight vessel sealed against fluid leaks to the front panel 130. In embodiments, a basket 120 is rotatably mounted within drum 118 such that the basket 120 is supported for rotation about axis A, generally parallel to transverse direction T. A motor 122 is in mechanical communication with basket 120 to selectively rotate basket 120 during various laundry cycles. According to some embodiments, motor 122 is in operative communication with controller 176 to rotate the basket at a plurality of rotational speeds depending on the selected laundry cycle. For example, if the laundry appliance 100 is a washing machine with an overnight dry cycle option, the controller 176 may instruct the motor 122 to rotate the basket at one speed for the washing operation and at a second, higher speed, for the drying operation.

The basket 120 defines an interior space 124 suitable for the receipt and treatment (for example washing or drying) of a load of clothes. For example, a load of clothes may be placed within the basket 120 and subjected to agitation through rotation of the basket 120 and one or more ribs 128 with a wash fluid. Fluids, such as wash fluid and air, may flow between the interior space 124 of the basket 120 and the drum 118 through a plurality of perforations 126. For example, as will be discussed in greater detail below, under certain conditions, a flow of air may enter the basket 120, flow through the perforations 126, and enter the tub 118 prior to being exhausted through an exhaust vent 226.

Returning to FIG. 1, the exemplary front loading laundry appliance 100 comprises a door assembly 200 that may be positioned over opening 132 and is rotatably mounted to front panel 130. More specifically appliance door assembly 200 is rotatable about door axis 202 that is substantially parallel to the vertical direction V. In this manner door assembly 200 permits selective access to opening 132 and basket 120 by being rotatable between an open position (FIG. 1) and a closed position (FIG. 3) blocking access to opening 132.

Figure 2:
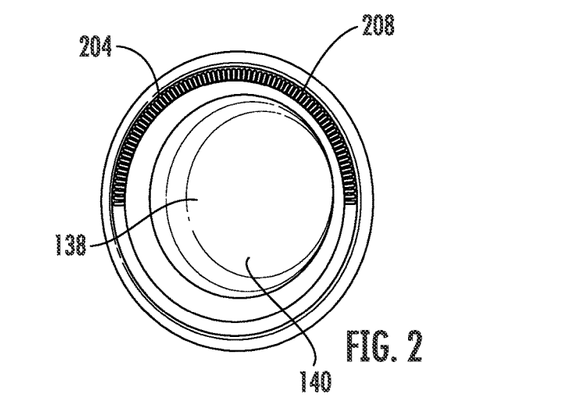
FIG. 2 provides a front view of a door suitable for use with the laundry appliance of FIG. 1.
Figure 4:
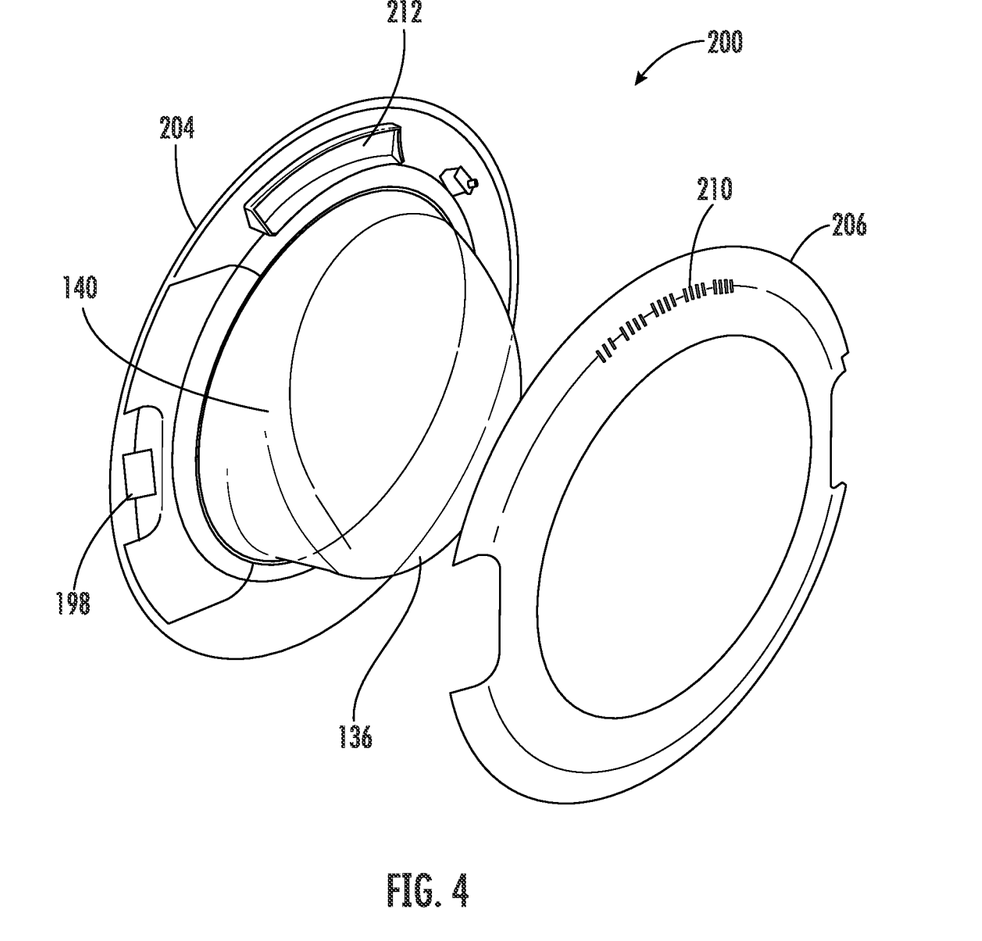
FIG. 4 provides an exploded view of a door assembly in accordance with an embodiment of the present disclosure.

According to the illustrative embodiment of FIGS. 2 and 4, door assembly 200 includes an outer door shell 204 and an inner door shell 206 secured to the outer door shell 204 generally forming door 134. In the embodiment illustrated, door assembly 200 also includes a window 140, comprising an inner face 136 and an outer face 138, generally centrally located in door assembly 200. As illustrated in FIG. 2, outer door shell 204 defines a door inlet 208 as an inlet vent for an air flow. Door inlet 208 may include a grille or grate to provide fluid communication between the outside environment 116 and an internal space between the outer and inner door shells 204, 206. Door inlet 208 is illustrated as generally parallel to front panel 130 in the illustrated embodiment. In other embodiments, the door inlet 208 may be directed in other directions, for example it may be directed upward through an edge of the door assembly 200. Other door assembly configurations may support a door inlet 208 directed generally in a vertically downward direction.

As illustrated, inner door shell 206 defines a door exhaust 210 aligned with door inlet 208 when the outer and inner door shells 204, 206 are secured together. The door exhaust 210 may be a grille or grate to provide fluid communication with the door inlet 208. In embodiments, a door duct 212 (FIGS. 4 and 5) is provided to fluidly couple the door inlet 208 and door exhaust 210. In other embodiments, door inlet 208 and door exhaust 210 may be in fluid communication with a space formed between the outer and inner door shells 204, 206 such that all, or substantially all, of an air flow into the door inlet 208 flows out of the door exhaust 210. Door latch 198 may be included to engage with front panel 130 to facilitate securing door assembly 200 in the closed position.

Figure 5:
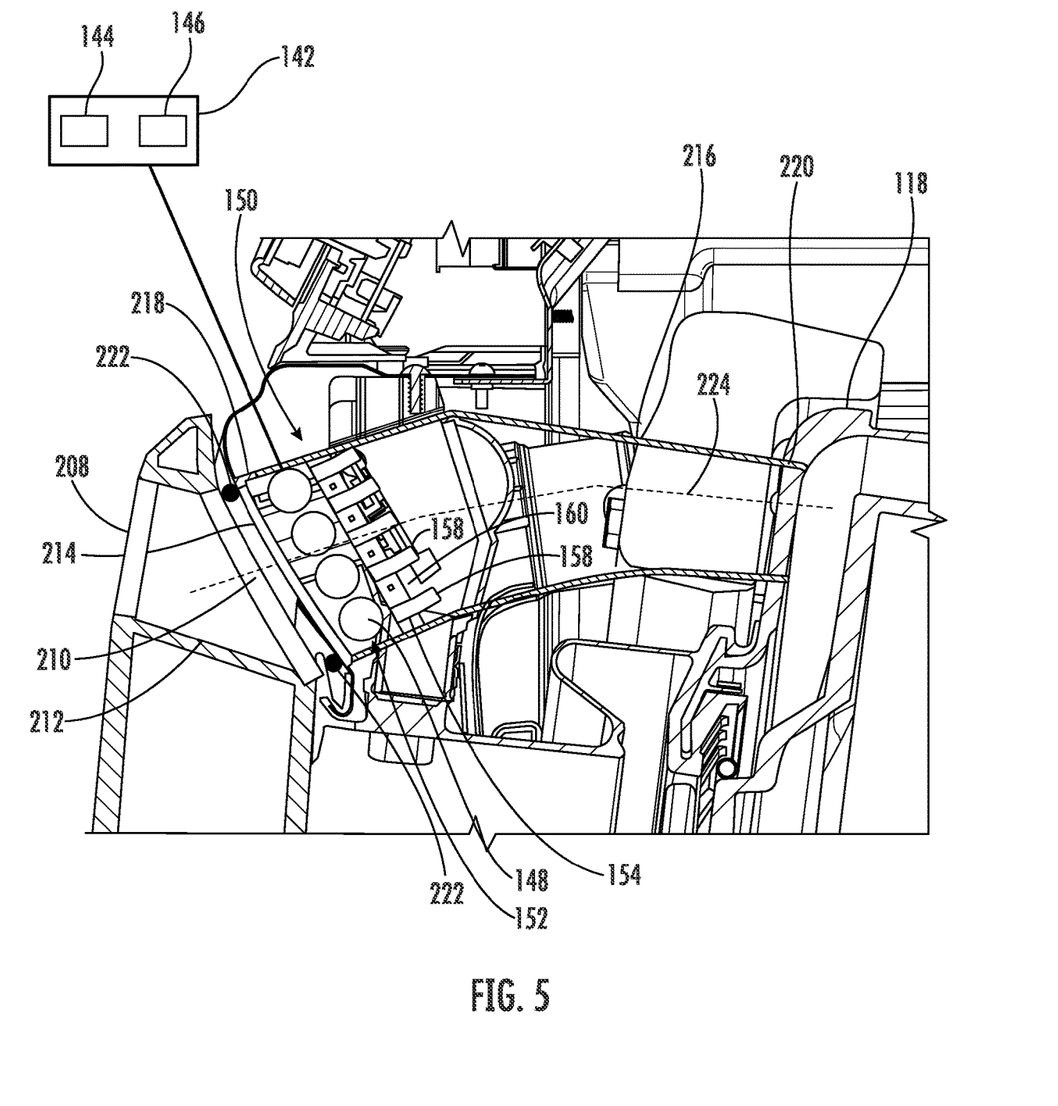
FIG. 5 provides an enlarged partial sectional view a door assembly and a portion of a cabinet in accordance with an embodiment of the present disclosure.

As best illustrated in FIG. 1, front panel 130 defines a cabinet inlet vent 214 located adjacent to opening 132. As illustrated in FIG. 5, the cabinet inlet vent 214 is fluidly coupled to first end 218 of cabinet duct 216. Second end 220 of cabinet duct 216 is fluidly coupled to the drum 118 defining a flow path 224 into the drum 118. When the door assembly 200 is in the closed position as illustrated in FIGS. 3 and 5, door exhaust 210 is in fluid communication with cabinet inlet vent 214. As such, an inlet flow path 224 is defined through the door assembly 200 (i.e., door inlet 208, door duct 212, and door exhaust 210), the cabinet inlet duct 216, and the drum 118.

In some embodiments, a sealing member 222 is provided on the inner door shell 206 to facilitate formation of a fluid-tight, or substantially fluid-tight, seal between the door exhaust 210 and the cabinet inlet vent 214. Sealing member 222 may form a gasket around door exhaust 210 that forms a seal around the cabinet inlet vent 214 when the door assembly 200 is in the closed position. Sealing member 222 may extend around the perimeter of the inner door shell 206 to facilitate a fluid-tight, or substantially fluid-tight, seal between the inner door shell 206 and the front panel 130 at opening 132 in addition to providing a fluid-tight, or substantially fluid-tight, seal between the door exhaust 210 and the cabinet inlet vent 214. In some alternate embodiments, the sealing member 222 may be provided on the front panel 130, extending around the opening 132 and the cabinet inlet vent 214, to facilitate formation of fluid-tight, or substantially fluid-tight, seals between the door exhaust 210 and the cabinet inlet vent 214 and between the inner door shell 206 and the front panel 130 at the opening 132.

Referring to FIG. 3, basket 120 may include one or more ribs 128 that extend from basket 120 into the interior of the basket. The ribs 128 may be configured such that, under certain laundry operations, rotation of the basket 120 and the ribs 128 urges an air flow through the basket 120. For example, a washing machine appliance may include an overnight or extended drying operation that may be facilitated by a flow of air. In the described manner, the ribs 128 may function to, among other things, create an air flow along air flow path 224 when the door assembly 200 is in the closed position and the basket 120 is rotating at an appropriate rotational speed. The urged air flow may facilitate processing (for example, drying) of articles in the basket 120 during a laundry operation.

As illustrated in FIGS. 1 and 3, exemplary embodiments include an exhaust vent 226 fluidly coupled to the drum 118 and in fluid communication with the external atmosphere 116. As discussed above, when the basket 120 is rotating, the ribs 128 may facilitate the formation of airflow along air flow path 224 into the basket 120. The airflow may continue through the perforations 126 in the basket 120 to the exhaust vent 226 and to the outside environment 116. The exhaust vent 226 may therefore comprise a portion of the air flow path 224 in some embodiments. In some embodiments, an exhaust fan 228 may be fluidly coupled to the exhaust vent 226 to facilitate an air flow along air flow path 224. Exhaust fan 228 may operate to urge a flow of air along air flow path 224 independently of the operation of the basket 120 in urging a flow of air. In other embodiments, the exhaust fan 228 may cooperate with the rotating basket 120 to support a flow of air through the basket 120 along flow path 224.

To facilitate processing (e.g., drying) of articles in basket 120, a flow of warmed air through the basket, at least while the basket 120 is rotating, may be desirable. In some embodiments, an induction heater is included within the flow path 224 to warm or heat an air flow directed through the basket 120. As generally understood, an induction heater comprises an induction coil and a conductor. An induction coil is an electrical device that, when energized, creates a rapidly alternating magnetic field. An electrical conductor, for example an element comprising a ferrous material, placed within the magnetic field generated by the induction coil reacts to the magnetic field. In particular, the magnetic field creates eddy currents within the electrical conductor. The eddy currents flow through the electrical conductor against the electrical resistance of the metallic conductor and heat the conductor through Joule heating. The process of Joule heating takes place provided the conductor is within the magnetic field and spaced from the induction coil (i.e., an air gap is maintained between the coil and the conductor). In such a configuration, the induction coil and the conductor may be considered to be operatively coupled.

In an embodiment of the present disclosure illustrated in FIG. 5, the induction heater 150 (i.e., induction coil 152 and heat transfer element 152) is located in cabinet duct 216 within the air flow path 224. The induction heater 150 may be located in any convenient location along the air flow path 224 to facilitate providing a flow of inlet air over the induction heater 150, particularly the heat transfer element 154. As illustrated, the induction heater 150 is generally located at the first end 218 of the cabinet duct 216, with the induction coil 152 proximate to the first end 218 and the heat transfer element 154 operatively coupled to the induction coil 152 and distal to the first end 218. In other embodiments, the induction heater may be located proximate to the second end 220 of cabinet duct 216, or at a position between the first and second ends 218, 220. In embodiments, the positional relationship of the induction coil 152 and the heat transfer element 154 may be reversed while maintaining the operatively coupled relationship. For example, in contrast to the embodiment illustrated in FIG. 5, the heat transfer element 152 may be adjacent to the first end 218 of the cabinet duct 216 and the induction coil may be distal to the first end 218 and operatively coupled to the heat transfer element 152.

As illustrated, the induction coil 152 comprises one or more (two shown in FIGS. 5 and 6; three turns shown in FIG. 7) turns 165 of a conductor capable of carrying an electric current, for example a metallic wire 148. Each turn 165 of the induction coil 152 is spaced from the adjacent turns and each turn spaced from the heat transfer element 152. One or more turns 165 of the induction coil 152 are operatively coupled to the heat transfer element 154.

Figure 6:
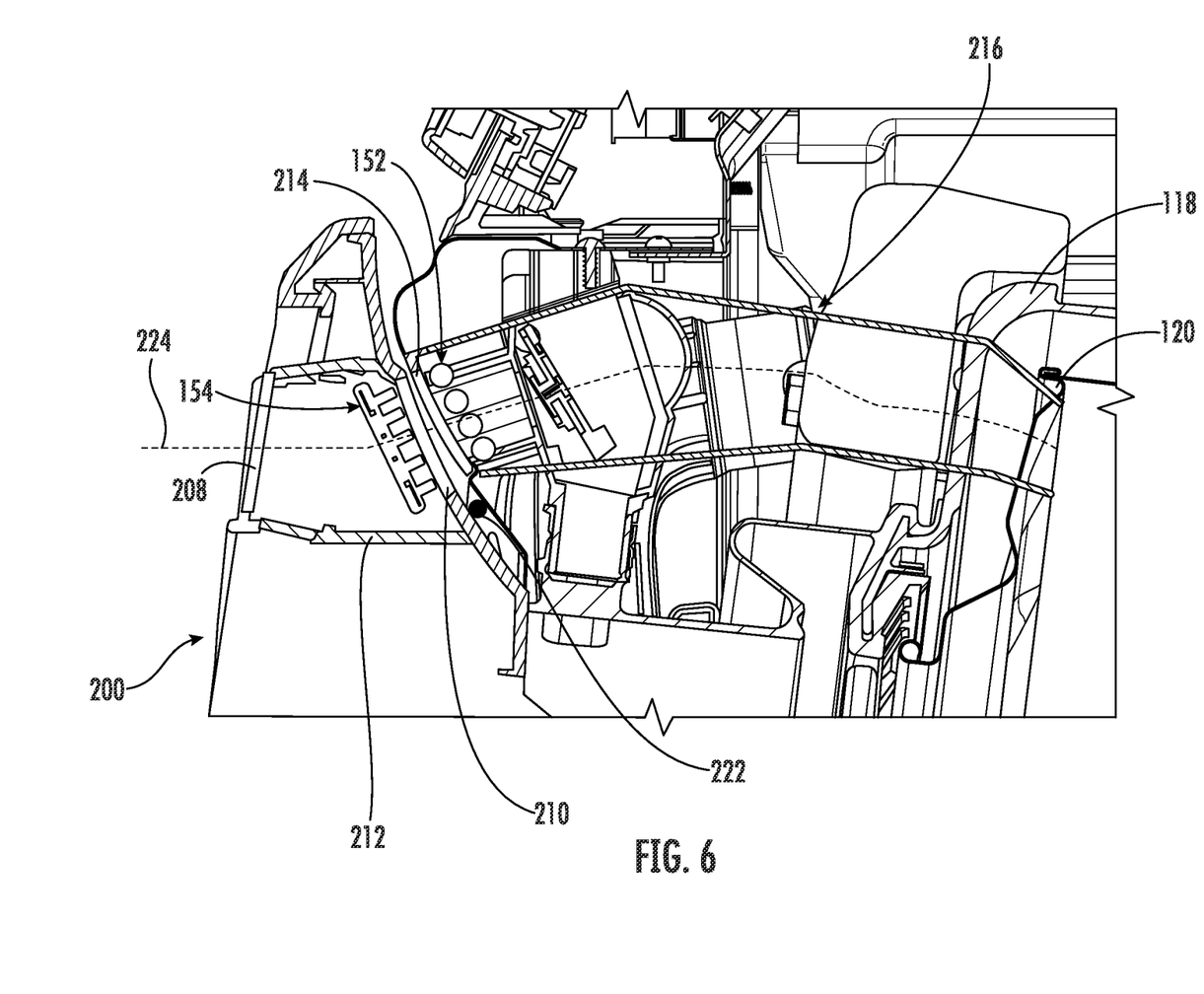
FIG. 6 provides an enlarged partial sectional view a door assembly in accordance with an embodiment of the present disclosure.

According to embodiments, at least one of the induction coil 152 and the heat transfer element 154 are disposed in door duct 212. As shown in FIG. 6, in embodiments the induction coil 152 and the heat transfer element 152 may be in different components of the front load laundry appliance 100. For example, as shown in FIG. 6, the induction coil 152 may be disposed in the cabinet duct 216 and the heat transfer element 154 may be disposed in the door duct 212 within the air flow path 224. Alternatively, the induction coil 152 may be within the cabinet 102 and outside of the cabinet duct 216 with the heat transfer element 154 inside the cabinet duct 216. In either configuration, when the door assembly 200 is in the closed position as shown, the induction coil 152 and the heat transfer element 154 may be sufficiently close to be operatively coupled. In other words, the magnetic field generated by the induction coil 152 is sufficient in intensity and proximity to induce eddy currents in the heat transfer element 154, and generate heat by Joule heating. In other embodiments, the induction coil 152 may be in the door assembly 200 and the heat transfer element 154 in the cabinet duct 216.

Figure 7:
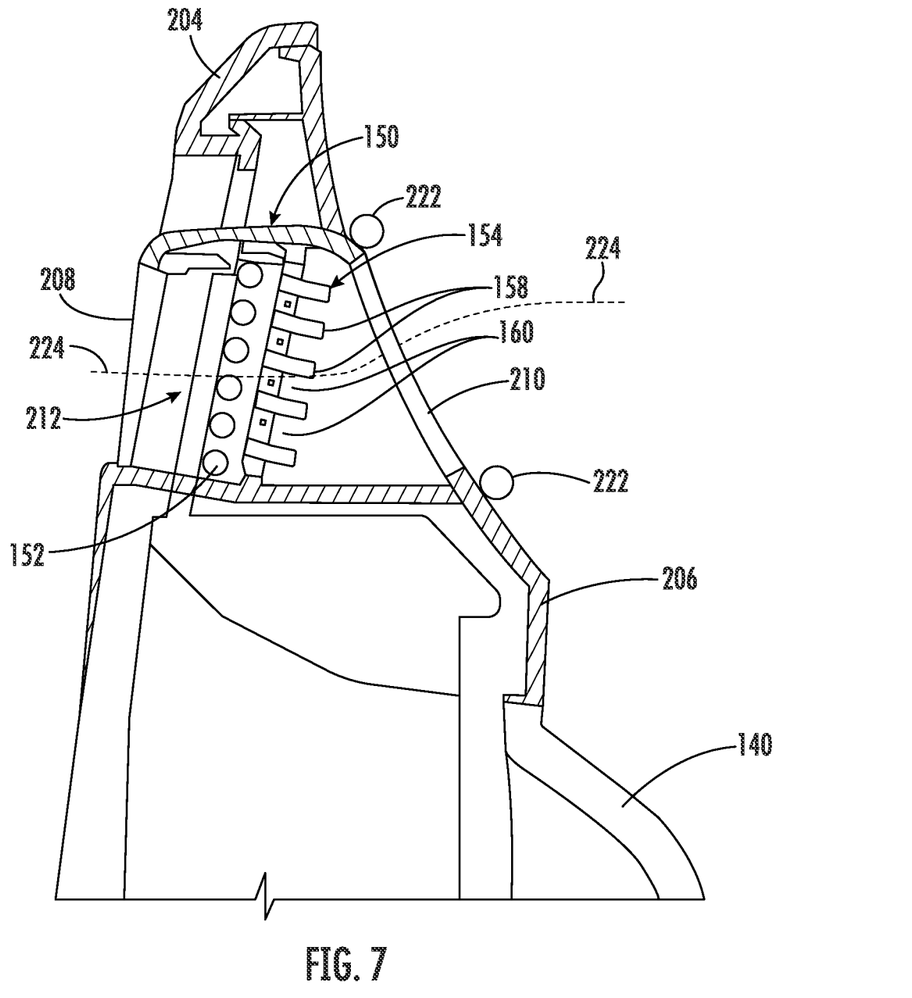
FIG. 7 provides an enlarged partial sectional view a door assembly and a portion of a cabinet in accordance with an embodiment of the present disclosure.

In the illustrative embodiment of FIG. 7, the induction coil 152 and the heat transfer element 154 (i.e., the induction heater 150) are disposed in door duct 212 within the inlet air flow path 224 such that the flow of inlet air passes over at least the heat transfer element 154. As illustrated, the induction coil 152 is disposed in the door duct 212 proximate to the door inlet 208 and the heat transfer element 154 is proximate the door exhaust 210. In embodiments, the position of the induction coil 152 and the heat transfer element 154 may be changed such that the heat transfer element 154 is proximate the door inlet and the induction coil 152 is proximate the door exhaust 210. As above, the relative placement of the induction coil 152 and the heat transfer element 154 is selected such that the induction coil 152 and the heat transfer element 154 are operatively coupled.

As generally understood and discussed above, a conductor in an induction heater is required in order to generate eddy currents in response the inductor's magnetic field. In embodiments of the present disclosure, the conductor is the heat transfer element 154. As such, the heat transfer element 154 comprises a metal, for example a ferrous metal, that may be acted upon by a magnetic field to generate eddy currents, and therefore generate heat through Joule heating. The heat transfer element 154 may be of any construction or shape suitable to interact with the magnetic field generated by the induction coil to generate heat and then transfer the heat (energy) to an air flow passing the heat transfer element 154 and at least partially in fluid contact with the heat transfer element 154.

In the illustrative embodiments of FIGS. 5-7, heat transfer element 154 comprises a body 156 with a plurality of plates 158 (5 shown) extending from the body 156 (generally the conductor of an induction heater). The body 156 may be a conductor, i.e., formed from an electrically conductive material such as one having a ferrous component. The plates 158 may be formed with the body 156 and therefore comprising the same or similar material as the body 156. In some embodiments, the plates 158 may be formed from a different material and affixed to the body 156 such that the body 156 and the plates 158 are in thermal communication. The plates may therefore be formed from a material different from the material of the body 156. In some embodiments, the plates 158 may be formed form a thermally conductive material, for example aluminum, and secured to the body 156 using known joining techniques such as a mechanical attachment (for example an interference or friction fit) or metal joining (such as soldering, brazing, or welding). In some embodiments, the plates 158 may be comparatively thin structures in relation to the body 156 and may be considered to be fins. The thin nature of the fins allows for an increased surface area in a fixed linear space along a long axis of the body 156 which may advantageously affect heat transfer characteristics of the heat transfer element 154.

Passages 160 may be formed between adjacent fins or plates 158 and may direct a flow of inlet air through or over the body 156. As illustrated in FIGS. 5-7, passages 160 may be generally aligned with the direction of air flow in the air flow path 224 (i.e., generally parallel to the air flow path 224). In other embodiments, the fins or plates 158 may be positioned at an acute angle to the body 156. In still other embodiments, the fins or plates 158 may have a curvilinear orientation such that adjacent plates 158 are parallel. The curvilinear plates 158 form similarly configured passages 160 which increase the surface are in contact with the air flow and slows the air flow as it passes through the passages 160 which may increase the efficiency of the heat transfer.

Figure 8:
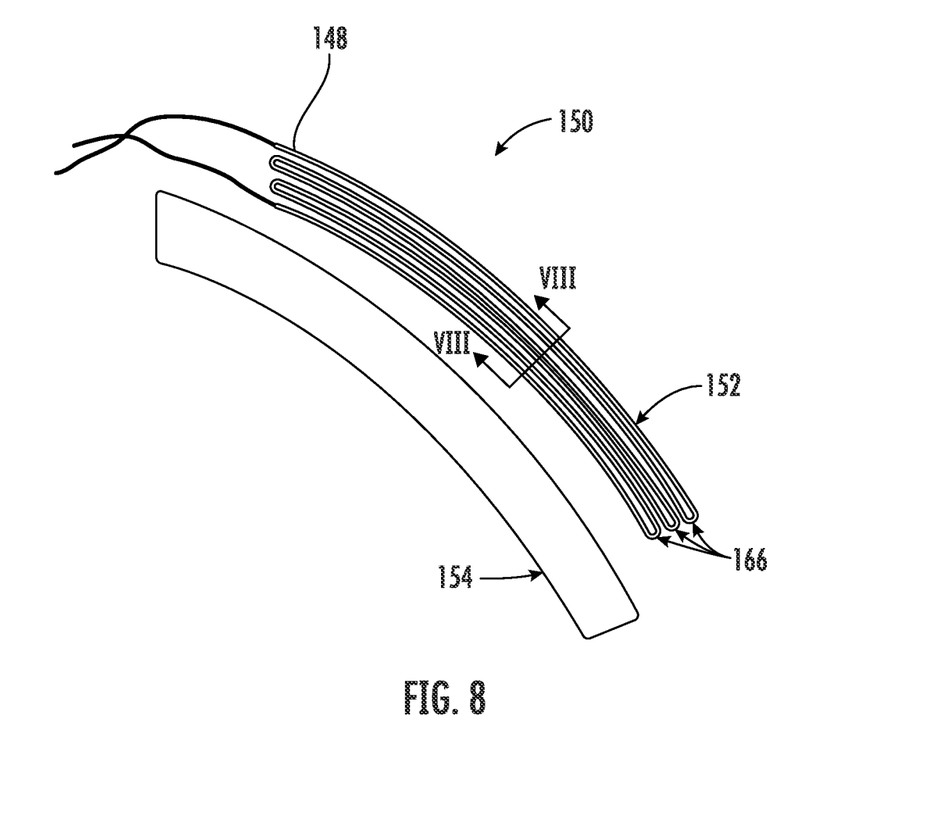
FIG. 8 provides an exploded view of an induction heater in accordance with an embodiment of the present disclosure.

Generally, the induction heaters of FIGS. 5-7 may be illustrated more clearly in FIG. 8 which is an exploded view representative of induction heater 150 shown in the figures. The induction coil 152 of FIG. 8 is illustrated as having three turns 166, most closely representing the induction coil 152 of FIG. 7. A cross sectional view taken along VIII-VIII of FIG. 8 shows six wires in cross section as shown in FIG. 7. Alternate embodiments of induction coil 152 shown in FIGS. 5 and 6 have two turns and are represented in the figures as four wires in cross section. As one of ordinary skill in the art will appreciate, an induction coil 152 may have any number of turns as required to develop a magnetic field to affect the associated conductor of the induction heater.

Figure 9:
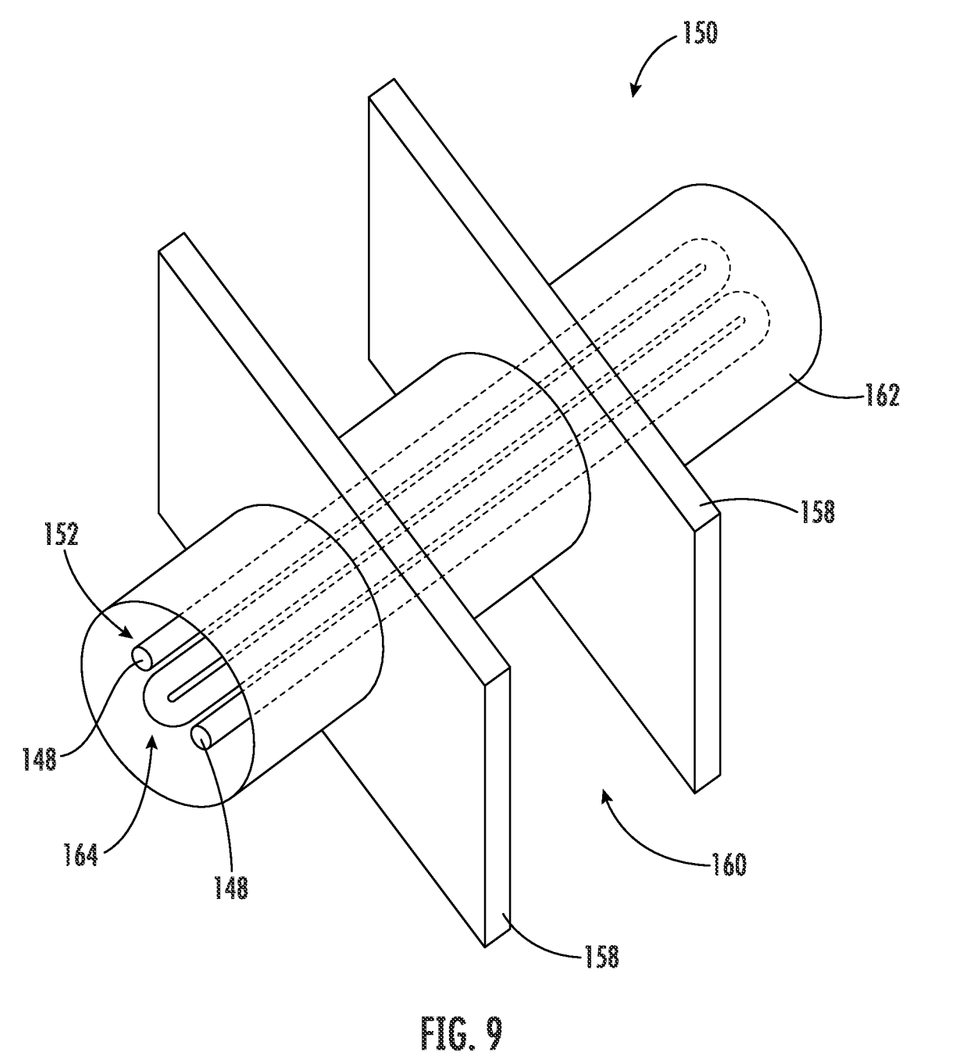
FIG. 9 provides a perspective view of another induction heater in accordance with an embodiment of the present disclosure.

In an embodiment illustrated in FIG. 9, the induction heater 150 comprises a metallic, i.e., comprising a ferrous material, conductor formed as a tube 162 defining an interior space 164. An induction coil 152 is disposed in the interior space 164. As illustrated, the induction coil 152 comprises a wire 148 capable of carrying an electric current, the wire arranged in one or more turns 166 (two shown) within the interior space 164. The turns 166 of the wire are supported within the interior space 164 such that the wires do not touch the tube 162 or each other. As discussed above, the induction coil 152 (i.e., wires 148) is operatively coupled to the tube 162 acting as a conductor in the induction heater 152. The wires carry an electric current and generate a magnetic field which induces eddy currents in the conductive tube 162. The eddy currents, moving against electrical resistance in the tube 162, generate heat in the tube 162 which is transferred by the fins or plates 158 to an air flow directed through the passages 160 formed between the plates. In some embodiments, the fins or plates 158 are formed of a non-ferrous material, for example aluminum. As above, the passages 160 may direct at least a portion of the flow of inlet air.

Control of laundry appliance 100, including operation and monitoring of induction heater 150, may be provided by controller 176 operatively in communication with a control unit. For example, an electrical control circuit 142 may be in functional communication with the induction heater 150. The control circuit 142 may include circuitry 144 (including power supplies, switches, timers, circuit interrupters, temperature sensors, and the like) necessary to selectively provide electrical power to, and monitor performance of, the induction coil 152. For example, in a drying operation, the control circuit may selectively energize and de-energize the induction coil 152 to maintain the heat transfer element 152 in a temperature range between a predetermined maximum temperature and a predetermined minimum temperature. The control circuit 142 may include a door position sensor 146 to provide power to the induction coil 152 only when the door assembly 200 is in certain positions, for example in the closed position as illustrated in FIGS. 3 and 5. Other controls and features may be included in the control circuit 142 to facilitate operation of the induction heater 150 and provide other laundry appliance features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A front load laundry appliance defining a vertical, a lateral, and a transverse direction, the front load laundry appliance comprising:
   a cabinet comprising a front panel, the front panel defining an opening and a cabinet inlet vent;
   a drum positioned within the cabinet and accessible through the opening;
   a cabinet duct fluidly coupling the cabinet inlet vent to the drum;
   a door assembly mounted to the cabinet and being rotatable between an open position allowing access to the opening and a closed position blocking access to the opening, the door assembly comprising a door duct, wherein an inlet flow path is defined through the door duct, the cabinet inlet vent, and the drum;
   an induction heater comprising an induction coil and a heat transfer element, the induction heater located within the inlet flow path such that a flow of inlet air in the inlet flow path passes over the heat transfer element,
   wherein the door assembly comprises an outer door shell defining a door inlet and an inner door shell defining a door exhaust,
   wherein the door duct fluidly couples the door inlet and the door exhaust,
   wherein the door exhaust and the cabinet inlet vent are in fluid communication when the door assembly is in the closed position; and
   a sealing member is disposed on the inner door shell, the sealing member providing a substantially airtight seal around the door exhaust and the cabinet inlet vent.

2. The front load laundry appliance of claim 1, wherein the induction coil comprises a wire capable of carrying an electric current, the wire arranged in one or more turns, wherein the heat transfer element is operatively coupled to the induction coil.

3. The front load laundry appliance of claim 1, wherein at least one of the induction coil and the heat transfer element is disposed in the door duct.

4. The front load laundry appliance of claim 1, wherein at least one of the induction coil and the heat transfer element is disposed in the cabinet duct.

5. The front load laundry appliance of claim 1, wherein the heat transfer element comprises a conductor and one or more plates extending from the conductor.

6. The front load laundry appliance of claim 5, wherein the conductor comprises a ferrous tube defining an internal space and the induction coil is disposed in the internal space.

7. The front load laundry appliance of claim 5, wherein the conductor comprises a ferrous material and the one or more plates are non-ferrous fins.

8. The front load laundry appliance of claim 1, wherein the heat transfer element defines one or more passages for directing the flow of inlet air.

9. The front load laundry appliance of claim 1, further comprising a basket supported for rotation within the drum, wherein an interior of the basket comprises one or more ribs configured such that rotation of the basket urges the flow of inlet air from the door duct to the basket.

10. The front load laundry appliance of claim 9, further comprising an exhaust duct having a first end fluidly coupled to the basket and a second end in fluid communication with an outside environment.

11. The front load laundry appliance of claim 10, further comprising an exhaust fan fluidly coupled to the exhaust duct, wherein the exhaust fan urges the flow of inlet air along the inlet flow path and to the outside environment.

12. A front load clothes washer laundry appliance defining a vertical, a lateral, and a transverse direction, the laundry appliance comprising:
- a cabinet comprising a front panel, the front panel defining an opening and a cabinet inlet vent;
- a drum positioned within the cabinet and accessible through the opening;
- a cabinet duct fluidly coupling the cabinet inlet vent to the drum;
- a door assembly rotatably mounted to the cabinet and rotatable between an open position allowing access to the opening and a closed position blocking access to the opening, the door assembly comprising:
  - an outer shell defining a door inlet;
  - an inner shell defining a door exhaust;
  - a door duct fluidly coupling the door inlet and the door exhaust, wherein an inlet flow path is defined through the door inlet, the door duct, the door exhaust, the cabinet inlet vent, the cabinet duct, and the drum; and
  - a sealing member disposed on the inner shell, the sealing member providing a substantially airtight seal around the door exhaust and the cabinet inlet vent; and
- an induction heater comprising an induction coil and a heat transfer element, the induction heater located within the inlet flow path,
- wherein a flow of inlet air in the inlet flow path passes over the induction heater.

13. The front load clothes washer laundry appliance of claim 12, wherein at least one of the induction coil and the heat transfer element is located in the door duct.

14. The front load clothes washer laundry appliance of claim 12, wherein the induction heater is located in the cabinet duct.

15. The front load clothes washer laundry appliance of claim 12, further comprising a basket supported for rotation within the drum, wherein an interior of the basket comprises one or more ribs configured such that rotation of the basket urges the flow of inlet air from the door duct to the drum.

16. The front load clothes washer laundry appliance of claim 12, further comprising a fan configured to urge the flow of inlet air along the inlet flow path.

17. The front load clothes washer laundry appliance of claim 12, wherein the heat transfer element defines one or more passages for directing the flow of inlet air.

18. A front load laundry appliance defining a vertical, a lateral, and a transverse direction, the front load laundry appliance comprising:
- a cabinet comprising a front panel, the front panel defining an opening and a cabinet inlet vent;
- a drum positioned within the cabinet and accessible through the opening;
- a cabinet duct fluidly coupling the cabinet inlet vent to the drum;
- a door assembly mounted to the cabinet and being rotatable between an open position allowing access to the opening and a closed position blocking access to the opening, the door assembly comprising a door duct, wherein an inlet flow path is defined through the door duct, the cabinet inlet vent, and the drum; and
- an induction heater comprising an induction coil and a heat transfer element, the induction heater located within the inlet flow path such that a flow of inlet air in the inlet flow path passes over the heat transfer element,
  - wherein the heat transfer element comprises a conductor and one or more plates extending from the conductor, and
  - wherein the conductor comprises a ferrous tube defining an internal space and the induction coil is disposed in the internal space.

19. The front load laundry appliance of claim 18, wherein the door assembly comprises an outer door shell defining a door inlet and an inner door shell defining a door exhaust, wherein the door duct fluidly couples the door inlet and the door exhaust.

20. The front load laundry appliance of claim 19, wherein the door exhaust and the cabinet inlet vent are in fluid communication when the door assembly is in the closed position.

* * * * *